United States Patent [19]

Kolarik et al.

[11] Patent Number: 4,839,101

[45] Date of Patent: Jun. 13, 1989

[54] PROCESS FOR IMPROVING THE EFFECTIVENESS OF THE REMOVAL OF ZIRCONIUM FROM A NUCLEAR FUEL AND/OR FERTILE MATERIAL SOLUTION

[75] Inventors: Zdenek Kolarik, Karlsruhe; Robert Schuler, Germersheim, both of Fed. Rep. of Germany

[73] Assignee: Kernforschungszentrum Karlsruhe GmbH, Karlsruhe, Fed. Rep. of Germany

[21] Appl. No.: 7,995

[22] Filed: Jan. 29, 1987

[30] Foreign Application Priority Data

Jan. 29, 1986 [DE] Fed. Rep. of Germany ....... 3602591

[51] Int. Cl.[4] ...................... G21C 19/42; G21C 19/50; C01G 56/00

[52] U.S. Cl. .................................... 252/627; 210/665; 210/682; 210/688; 210/781; 210/800; 252/626; 252/631; 252/634; 423/6; 423/18; 423/251

[58] Field of Search ................. 252/68, 627, 628, 631, 252/634.5; 210/682, 660, 668, 681, 685, 688, 757, 682, 665, 800, 781, 767, 688; 423/70, 2, 73, 69, 80, 6, 8, 251

[56] References Cited

U.S. PATENT DOCUMENTS

| | | | |
|---|---|---|---|
| 2,923,607 | 2/1960 | Peppard | 423/70 |
| 3,850,835 | 11/1974 | Marantz et al. | 423/70 |
| 4,192,748 | 3/1980 | Hyden | 210/259 |
| 4,256,463 | 3/1981 | Carter | 423/85 |
| 4,521,528 | 6/1985 | Kovach | 502/150 |
| 4,572,824 | 2/1986 | Kim | 423/70 |
| 4,629,656 | 12/1986 | Alberti et al. | 423/69 |

FOREIGN PATENT DOCUMENTS

| | | | |
|---|---|---|---|
| 1473361 | 2/1966 | France . | |
| 914004 | 12/1962 | United Kingdom . | |

*Primary Examiner*—Stephen J. Lechert, Jr.
*Assistant Examiner*—Howard Locker
*Attorney, Agent, or Firm*—Spencer & Frank

[57] ABSTRACT

The invention relates to a process for improving the effectiveness of the removal of zirconium from an aqueous, zirconium-containing nuclear fuel and/or fertile material solution in nitric acid in a liquid-liquid extraction process.

Accordingly, the object of the invention is to improve the removal of zirconium from the reprocessing solutions and, at the same time, to simplify the course of the process. The invention seeks to improve decontamination of the uranium product and the plutonium product while, at the same time, reducing the outlay involved. According to the invention, this object is achieved in that, in a process step carried out before the first extraction of the nuclear fuels and/or fertile materials, the zirconium is converted from the dissolved state into a filterable or centrifugable solid phase by the use of an adsorbent from the group of inorganic ion exchangers and is removed from the aqueous solution together with the adsorbent.

3 Claims, 1 Drawing Sheet

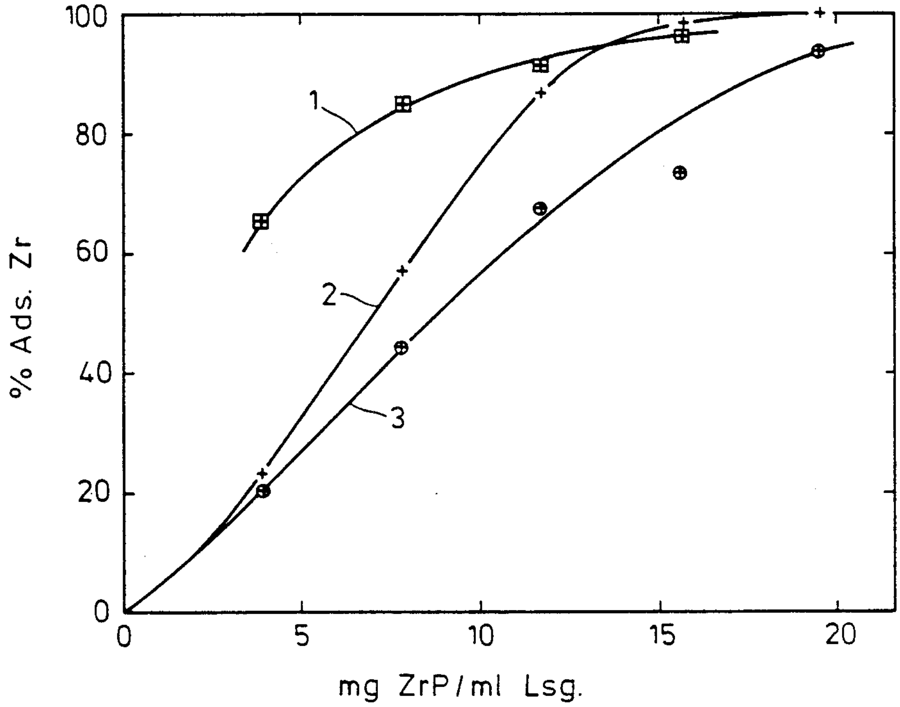
100
80
60
40
20
0
% Ads. Zr
1
2
3
0
5
10
15
20
mg ZrP/ml Lsg.

PROCESS FOR IMPROVING THE EFFECTIVENESS OF THE REMOVAL OF ZIRCONIUM FROM A NUCLEAR FUEL AND/OR FERTILE MATERIAL SOLUTION

BACKGROUND OF THE INVENTION

This invention relates to a process for improving the effectiveness of the removal of zirconium from an aqueous zirconium-containing nuclear fuel and/or fissionable material solution in nitric acid in a liquid-liquid process.

A relatively large quantity of zirconium is directly or indirectly formed through the fission of $^{235}U$, $^{239}Pu$, etc. This zirconium is a mixture of stable and radioactive isotopes and belongs to the fission products which represent the greatest obstacle to the reprocessing of spent nuclear fuels and/or fissionable materials by the so-called Purex process for the recovery of unused uranium and plutonium. After dissolution of the spent fuel in nitric acid, the zirconium is present in the fuel solution in a nitrate form which shows chemically complicated and not always reproducible behavior. The extractant (hereinafter referred to as solvent) used in the Purex process is a solution of tributyl phosphate (TBP) in an alkane mixture (kerosene). Acidic butyl phosphates (dibutyl and monobutyl phosphate) and phosphoric acid are formed during the Purex process through radiolytic and hydrolytic decomposition of a small part of the TBP. In the absence of acidic butyl phosphates, the extractability of the zirconium with the solvent is just low enough to enable the zirconium to be separated from uranium and plutonium in the Purex process. Even in low concentrations, however, acidic butyl phosphates increase the extractability of zirconium(IV) salts and it then becomes correspondingly more difficult sufficiently to free uranium and plutonium from $^{95}Zr$ after relatively short cooling times of the fuel (less than 1 year). However, after long cooling times when the radioactivity of $^{95}Zr$ has decayed (half life 65 d) and decontamination is no longer so important, the difficulties which can arise out of the relatively high chemical concentration of zirconium in the fuel solutions after any cooling period still remain. This is because the zirconium(IV) tends to form deposits (so-called crud) with phosphoric acid and, in some cases, even with acidic butyl phosphates. These deposits seriously affect the fluid dynamics of the extraction steps of the Purex process.

Hitherto, sufficient decontamination of, i.e. removal of Zr from, the solutions to be further processed has only been achieved by expensive repetitions of extraction steps in several clean-up cycles. The formation of crud could not be reliably prevented.

SUMMARY OF THE INVENTION

Accordingly, the object of the invention is to improve the removal of Zirconium from the reprocessing solutions and, at the same time, to simplify the course of the process. The invention seeks to improve decontamination of the uranium product and the plutonium product whilst, at the same time, reducing the outlay involved.

According to the invention, this object is achieved in that, in a process step carried out before the first extraction of the nuclear fuels and/or fissionable materials, the zirconium is converted from the dissolved state into a filterable or centrifugable solid state by the use of an adsorbent from the group of inorganic ion exchangers and is removed from the aqueous solution together with the adsorbent.

In advantageous embodiment of the process according to the invention,, zirconium phopsphate (ZrP) is used as the adsorbent. A ZrP produced on the basis of a starting ratio of P to Zr of from 3.5 to 4.5 is advantageously used.

In order to produce solid zirconium phosphate eminently suitable for use as adsorbent, dilute phosphoric acid (1:6) was very slowly added dropwise with intensive stirring at room temperature, for example, to a solution of zirconium oxychloride (approximately 250 q/l) in 1 M nitric acid. The highly voluminous, jelly-like deposit formed with filtered off and washed free from phosphate by repeated taking up in hot water and subsequent filtration. After preliminary drying for several days on a filter at room temperature, the product was dried twice in succession for 24 h at 50° C., being mechanically size-reduced between the drying periods. Different batches of zirconium phosphate were prepared by varying the molar starting ratio of P to Zr between 5:1 and 1:2 during precipitation. The ratio of P to Zr in the washed deposit may of course differ from the starting ratio.

A batch of ZrP prepared with a molar starting ratio of P:Zr of 4.25 was used in most tests. In order to establish favorable conditions for the adsorption of zirconium(IV) onto zirconium phosphate, it is possible above all to vary the contact time of the adsorbent with the fuel solution, the quantity of adsorbent per unit volume of fuel solution and the concentration of nitric acid in the fuel solution. The maximum expected nitric acid concentration is between 5 and 10 moles/l and is determined by the conditions under which the fuel is dissolved. The nitric acid concentration can scarcely be lower than 3 moles/l because of the demands on the effectiveness and selectivity of the extraction of uranium and plutonium with TBP. After the adsorption of zirconium(IV), the adsorbent may be separated from the supernatant solution by filtration or centrifuging. Both methods were used in the following tests. The zirconium was determined by $\gamma$-spectrometry by labelling with $^{95}Zr$ using a Ge-(Li) detector. Plutonium was determined by a-spectrometry while nitric acid was determined by alkalimetric titration (potentiometric indication) after masking of Zr(IV) and/or Pu/(IV) and U(VI) with oxalate and fluoride ions.

The adsorptive power of zirconium phosphate for zirconium(IV) is sufficiently high (see Figure). However, the effectiveness of the removal of zirconium from the solution may be significantly increased when the liquid phase separated from the ZrP is left standing for a prolonged period. During this period, a small quantity of a deposit containing more than 90% by weight of the Zr still remaining in the solution immediately after adsorption separates from the solution (see Example 2). By adopting this procedure, the zirconium may be separated from a fuel solution with considerable effectivenss (see Example 3). Through the treatment with zirconium phosphate, a small quantity of phosphoric acid is introduced into the fuel solution. In spite of this, however, the coefficient of distribution of plutonium remains high enough for the effective extraction of plutonium in a countercurrent extractor (see Example 4). A small proportion of plutonium (<5%) is adsorbed together with zirconium. The adsorbed plutonium may be washed out with a 5 mole/l solution of nitric acid, >99.5% of the adsorbed quantity of zirconium remaining adsorbed.

The invention is illustrated in the following by the description of a few exemplary tests which, for the purposes of differentiation, have been called Examples.

EXAMPLE 1

The chemical and adsorptive properties of the zirconium phosphate used here as a comprehensive term depend upon the molar starting ratios of Zr to P.

A solution containing zirconium(IV) and 5 moles nitric acid/l was shaken with zirconium phosphate (prepared as described above) and the unadsorbed zirconium-(IV) was measured immediately after shaking. The results obtained with various quantities of zirconium phosphate per unit volume of the solution are shown in the Figure. Curve 1 was obtained at a starting concentration of the zirconium of 0.001 mole/l and after a shaking time of 1 h at the boiling temperature of the solution. The other results were obtained after a shaking time of 40 minutes at room temperature, the starting concentration of zirconium(IV) being 0.001 mole/l (curve 2) and 0.002 mole/l (curve 3).

EXAMPLE 2

Solutions containing zirconium(IV), nitric acid and, in some cases, also uranium(VI) and/or plutonium(IV) were shaken with zirconium phosphate (prepared as described above). The unadsorbed zirconium(IV) was measured immediately after shaking and after various periods of standing of the solution separated from zirconium phosphate. Before each measurement, the solution was centrifuged. The starting solutions were:

5M $HNO_3$+0.001M Zr(IV) in test 1,

5M $HNO_3$+0.001M Zr(IV)+250 g U(VI)/l in test 2,

5M $HNO_3$+0.001M Zr(IV)+20 g Pu(IV)/l in test 3,

5M $HNO_3$+0.001M Zr(IV)+250 g U(VI)/l+20 g Pu-(IV)/l in test 4.

Comparative tests for the improving effect of adsorption on after-precipitation produced the following result (cf. test 1):

The proportion of Zr(IV) remaining in the solution immediately after the adsorption of originally 0.0010M Zr(IV) onto ZrP from 5 M $HNO_3$ (shaking time 40 mins) and after 5 days' standing of the liquid phase separated from the ZrP (in each case at room temperature) is shown in Table 1.

TABLE 1

| mg ZrP/ml solution | % Zr remaining in the solution immediately | after 5 days |
|---|---|---|
| 9.8 | 8.2 | 0.61 |
| 19.6 | 4.2 | 0.23 |
| 29.4 | 3.3 | 0.156 |
| 39.2 | 1.6 | 0.072 |
| 58.8 | 1.5 | — |
| 78.4 | 0.94 | — |

The proportion of zirconium(IV) remaining in the solution in tests 1 to 4 for different quantities of zirconium phosphate (ZrP) per unit volume of the solution was as follows:

TABLE 2

| Test no. | Standing time h | % Zr in the solution for mg ZrP/ml solution 12.5 | 25 | 50 |
|---|---|---|---|---|
| 1 | 0 | 1.7 | 0.36 | 0.13 |
| | 4 | 1.0 | 0.26 | 0.14 |
| | 22 | — | 0.17 | <0.1 |
| | 28 | <0.1 | <0.1 | <0.1 |
| | 95 | <0.1 | <0.1 | <0.1 |
| 2 | 0 | 20 | 5.7 | 1.4 |
| | 4 | 18 | 4.9 | 1.3 |
| | 22 | 15 | 3.7 | 0.84 |
| | 28 | 14 | 3.6 | 0.69 |
| | 95 | 12 | 2.9 | 0.60 |
| 3 | 0 | 9.4 | 4.8 | 1.5 |
| | 17 | 4.7 | 2.9 | 0.52 |
| | 26 | 3.7 | 2.2 | 0.53 |
| | 91 | 3.2 | 1.6 | 0.26 |
| 4 | 0 | 51 | 11 | 3.7 |
| | 17 | 34 | 6.9 | 1.6 |
| | 26 | 22 | 5.5 | 1.4 |
| | 91 | 15 | 4.7 | 0.86 |

EXAMPLE 3

A fuel solution was prepared by dissolving a fast-breeder fuel, of which the burn-up amounted to 74,000 MWd/t and which had a cooling time of around 15 months, in 8 to 10 moles/l nitric acid. The composition of the solution was 124 g U(VI)/l, 36.5 g Pu(IV)/l and 6.5 moles nitric acid/l. Parts of this solution were shaken with zirconium phosphate and the zirconium adsorbed was determined. For the effective separation of zirconium, it proved to be of advantage to treat the solution with two portions of zirconium phosphate added in succession. Two methods of treatment were compared:

(A) The solution was shaken for 30 minutes with the first portion of zirconium phosphate and then filtered. The zirconium(IV) remaining in the solution was measured immediately after filtration and after standing times of 2 h and 17 h. Immediately after the second measurement (see Table 3), the second portion of zirconium phosphate was added and the test was continued as described above, the shaking time on this occasion being only 20 minutes.

(B) The solution was shaken for 30 minutes with the first portion of zirconium phosphate, but was not filtered afterwards. The zirconium(IV) remaining in the solution was measured after a standing time of 2 h. Without separating the first portion of the zirconium phosphate from the solution, the second portion was added immediately after the measurement. The zirconium remaining in the solution was then measured immediately after shaking for 20 minutes and then after standing for 20 h.

In methods A (the first three tests) and B (the remaining tests), the zirconium(IV) remaining in the solution (ZrP is zirconium phosphate) was as shown in Table 3.

TABLE 3

| mg ZrP/ml solution 1st portion | 2nd portion | % Zr remaining in the solution: 1st portion ZrP immediately | after 2 h | after 17 h | 2nd portion ZrP immediately | after 20 h |
|---|---|---|---|---|---|---|
| 25 | 25 | 63 | — | 60 | <0.1 | — |
| 50 | 25 | 31.5 | — | 24 | <0.1 | — |
| 75 | 25 | 19.7 | — | 8.9 | <0.1 | — |
| 12.5 | 12.5 | — | 54 | — | 27.4 | 13.4 |

TABLE 3-continued

| mg ZrP/ml solution | | % Zr remaining in the solution | | | | |
|---|---|---|---|---|---|---|
| 1st | 2nd | 1st portion ZrP | | | 2nd portion ZrP | |
| portion | portion | immediately | after 2 h | after 17 h | immediately | after 20 h |
| 12.5 | 25 | — | 51 | — | 12.4 | 2.9 |
| 25 | 12.5 | — | 42 | — | 7.6 | 2.3 |
| 25 | 25 | — | 41 | — | 4.8 | 1.4 |

The separation of the first portion of zirconium phosphate before addition of the second portion clearly benefits the removal of zirconium from the fuel solution.

EXAMPLE 4

A solution containing ~2 g Pu(IV)/1 and 5 moles nitric acid/l ws shaken for 30 minutes at room temperature with zirconium phosphate (20 mg/ml solution) and then left standing for 24 h. The solution was then removed via the solid phase and shaken for 3 minutes with the same volume of 30% by volume TBP in dodecane. The aqueous phase separated off was then shaken three times with fresh portions of 30% TBP (on this occasion equilibrated beforehand with 3 M $HNO_3$) and, after each phase contact, the distribution coefficient of plutonium ($D_{Pu}$) was measured. The following results were obtained in this test:

TABLE 4

| Number of phase contacts | Concentration in the aqueous equilibrium phase | | $D_{Pu}$ |
|---|---|---|---|
| | mg Pu/l | moles $HNO_3$/l | |
| 1 | 119 | 4.11 | 19.1 |
| 2 | 7.25 | 3.56 | 12.4 |
| 3 | 1.93 | 3.36 | 3.8 |
| 4 | 0.74 | 3.28 | 2.0 |

Although the distribution coefficient of Pu decreases with increasing number of phase contacts, it remains high enough for effective extraction in a countercurrent extractor. The reduction in the $D_{Pu}$-value after the repeated extraction may, but does not have to, be attributed to the presence of small amounts of phosphoric acid in the aqueous phase. In countercurrent tests, it is often found that a small proportion of plutonium(IV) is present in aqueous solutions in a chemical state in which it is less extractable than the main quantity of Pu.

We claim:

1. A process for removing zirconium from uranium and plutonium during recycling of spent nuclear fuel or fissionable material, comprising the steps of:

dissolving spent nuclear fuel or fissionable materials in nitric acid to produce an acidic solution containing dissolved uranium, plutonium and zirconium;

adding zirconium phosphate to said acidic solution to selectively adsorb said dissolved zirconium into a filterable or centrifugible solid phase;

removing said zirconium phosphate and therewith said adsorbed zirconium from said acidic solution; and recovering uranium and plutonium from the acidic solution.

2. A process as defined in claim 1, comprising the additional step of producing the solid zirconium phosphate from starting materials having a phosphorous to zirconium ratio in a range from 3.5 to 4.5.

3. A process as defined in claim 1, comprising the additional step of treating the removed zirconium phosphate with nitric acid to remove adsorbed plutonium.

* * * * *

UNITED STATES PATENT AND TRADEMARK OFFICE
CERTIFICATE OF CORRECTION

PATENT NO. : 4,839,101

DATED : June 13th, 1989

INVENTOR(S) : Zdenek KOLARIK et al.

It is certified that error appears in the above-identified patent and that said Letters Patent is hereby corrected as shown below:

IN THE TITLE:

Please correct the title to read -- A PROCESS FOR IMPROVING THE EFFECTIVENESS OF THE REMOVAL OF ZIRCONIUM FROM A NUCLEAR FUEL AND/OR FISSIONABLE MATERIAL SOLUTION -- .

Signed and Sealed this

Fifth Day of June, 1990

*Attest:*

HARRY F. MANBECK, JR.

*Attesting Officer*

*Commissioner of Patents and Trademarks*